(12) United States Patent
Monsheimer et al.

(10) Patent No.: US 7,025,842 B2
(45) Date of Patent: Apr. 11, 2006

(54) ULTRASOUND WELDING OF PLASTICS COMPONENTS

(75) Inventors: Sylvia Monsheimer, Haltern am See (DE); Rainer Göring, Borken (DE); Hans Ries, Marl (DE); Günter Brudny, Marl (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/826,334

(22) Filed: Apr. 19, 2004

(65) Prior Publication Data
US 2004/0206443 A1  Oct. 21, 2004

(30) Foreign Application Priority Data
Apr. 19, 2003  (DE) ................................ 103 18 321

(51) Int. Cl.
*B32B 37/00* (2006.01)
(52) U.S. Cl. ...................... 156/73.1; 156/294; 264/445
(58) Field of Classification Search ............... 156/73.1, 156/293, 294, 308.2, 580.1, 580.2; 264/442, 264/443, 445
See application file for complete search history.

(56) References Cited

U.S. PATENT DOCUMENTS

| | | | |
|---|---|---|---|
| 3,929,958 A * | 12/1975 | Parmann | 264/249 |
| 4,655,486 A * | 4/1987 | Tarnay et al. | 285/340 |
| 5,090,745 A | 2/1992 | Kluger | |
| 5,622,394 A * | 4/1997 | Soles et al. | 285/256 |
| 5,879,115 A | 3/1999 | Medal | |
| 5,957,163 A * | 9/1999 | Ito et al. | 138/109 |
| 6,231,085 B1 * | 5/2001 | Olson | 285/23 |
| 6,454,891 B1 * | 9/2002 | Goss | 156/73.5 |
| 6,555,243 B1 * | 4/2003 | Flepp et al. | 428/474.4 |
| 6,609,729 B1 * | 8/2003 | Nishiyama et al. | 285/94 |

FOREIGN PATENT DOCUMENTS

| | | |
|---|---|---|
| DE | 41 27 039 | 2/1992 |
| EP | 0 242 480 | 10/1987 |
| JP | 58-122822 | 7/1983 |

OTHER PUBLICATIONS

W. Land, Kunststoffe, vol. 68, No. 4, pp. 233–237, "Untersuchungen Zum Ablauf Des Ultraschallschweissens", 1978.

* cited by examiner

*Primary Examiner*—James Sells
(74) *Attorney, Agent, or Firm*—Oblon, Spivak, McClelland, Maier & Neustadt, P.C.

(57) ABSTRACT

A process for the bonding of a plastics pipe to another plastics part by ultrasound welding using sound waves which act longitudinally with respect to the pipe axis, while the arrangement of the areas to be welded is substantially parallel to the pipe axis. The welding procedure is combined with the forced insertion of the other plastics part into the plastics pipe in such a way that there is at least some overlap between the exposure to sound and the forced insertion.

10 Claims, 3 Drawing Sheets

ULTRASOUND WELDING OF PLASTICS COMPONENTS

CROSS-REFERENCE TO RELATED APPLICATIONS

This patent document claims priority to German Patent Publication 103 18 3213.3 filed Apr. 19, 2003, the entire contents of which are hereby incorporated herein by reference.

BACKGROUND OF THE INVENTION

1. Field of the Invention

The invention relates to a method for the bonding of a single- or multilayer pipeline to another plastics part, e.g. to a quick connector.

2. Discussion of the Background

There are known bonds between a pipe and a plastics part where the plastics part acts as a mandrel broaching the pipe. In this process, the pipe is widened in order to receive the nipple of the plastics part. The pipe then replicates any profile present on the nipple. This bond is required to have maximum resistance to permeation and leakage, to withstand high separation forces, and to resist distortion.

In the case of bonding of a fuel line and a quick connector, the use of a "wedding band" is also known (e.g., see DE 41 27 039 A1). The "wedding band" is forced onto the pipe prior to the process of broaching by a "mandrel," and during the process of broaching by the "mandrel" it is likewise widened, the separation forces thus being increased by virtue of the additional material.

However, the capabilities of a bond resulting from broaching by the above-noted "mandrel" do not meet all requirements, particularly not at high temperatures like those likely to occur in the engine compartment of a motor vehicle. Under such high temperatures, there is a marked reduction in resistance to separation and in resistance to distortion, the result sometimes being that the bond loses its coherence.

Other applications, such as medical technology applications, demand that the bond has coherence and stiffness.

One way of eliminating this problem consists of welding the two components to be bonded, for example, by high-speed hot gas welding, infrared welding, or electrical sleeve welding, or by means of a high-frequency field. The process most frequently used in plastics technology is ultrasound welding. Ultrasound is a term used relative to sound in a frequency range beyond the range perceptible to the human ear, e.g., from 20 kHz extending to frequencies of 1 GHz. In industrial ultrasound welding, an electrical method is used to excite the oscillations, by producing electrical oscillations in a generator. The piezoelectric converter principle, which underlies ultrasound welding, permits the electrical power of the generator to be converted into mechanical energy at very high efficiency. Electrical oscillations thus produce mechanical oscillations of identical frequency. Conventional ultrasound frequencies for plastics welding are from 15 to 40 kHz, but it is also possible to operate at substantially higher frequencies (e.g., up to 1010 kHz).

These ultrasound converters always oscillate longitudinally, which means that the direction of propagation and the direction of oscillation are coincident. An amplitude transformer unit, known as a sonotrode, couples the ultrasound converter to the energy-conducting welding tool. With the aid of the sonotrode, the longitudinal wave is substantially all conducted into the work piece to be welded. In the zone where welding occurs, the sound waves are converted into heat, initially via interfacial friction and then via both interfacial friction and friction at the molecular level. The material in the zone where welding occurs melts and melt flow occurs due to sonotrode pressure.

Examples of these processes are shown in W. Land, Kunststoffe 68 (1978) 4, pp. 233–237. However, the only arrangements known hitherto are those where the movement of the sonotrode takes place perpendicularly with respect to the area to be welded. If the area to be welded has a profile design, for example, a conical profile or olive profile on the stem of a quick connector, it is not the surfaces of the profile that are referred to here, but rather the outer surface of a cylinder represented by the stem. The profile then acts as an energy flow director which gives an energy concentration with a defined start (trigger) zone and welding zone. If a pipe is then welded to a quick connector, the parts to be welded have to be rotated once around their own axis so that an annular weld can be produced. This can cause problems if the individual components are bulky. In addition, the areas to be welded have to be mutually superposed prior to the welding process. For the bonding of a pipe and a quick connector, this means that a process of broaching using a "mandrel" still has to be carried out first. In the case of the abovementioned bond, therefore, the use of conventional ultrasound welding does not represent any simplification of the process, but rather an additional operation.

SUMMARY OF THE INVENTION

An object of the invention is to simplify the known process of ultrasound welding of components to be bonded, with no resultant impairment of the durability of the weld.

Surprisingly, this object is achieved by using a process for the bonding of a plastics pipe to another plastics part, which comprises performing ultrasound welding with sound waves which act longitudinally with respect to the pipe axis while maintaining the arrangement of the areas to be welded substantially parallel to the pipe axis, and forcing insertion of the other plastics part into the plastics pipe in such a way that there is at least some overlap between the exposure to the sound waves and the forced insertion during the ultrasound welding step.

The plastics pipe usually serves to convey fuels, solvents, oils, crop-protection agents, or the like. In one preferred embodiment, the plastics pipe is a motor vehicle pipeline, in particular a fuel line, a coolant line, a brake fluid line, a hydraulic fluid line, or a windshield washer system line. The pipe may have one or more layers, and up to seven layers are currently feasible industrially. This multilayer structure may include a barrier layer which inhibits the permeation of fuel components. Whereas the functional layers are generally composed of a molding composition based on polyamide or polyolefin, the barrier layer is composed of a molding composition based on materials such as polyester, fluoropolymer, or ethylene-vinyl alcohol copolymer. Any antistatic internal layer which may be present is composed of a molding composition which has been rendered antistatic by adding an electrically conductive component, such as conductivity black or graphite fibrils. These layers are conventional and are described in many publications. They may be produced by conventional extrusion or coextrusion, using a pipe calibrator or a plate calibrator, or they can be produced by using shaping tools (corrugated pipe take-off). Another known production process for these single- or multilayer pipes is blow molding, for example, suction blow molding or blow molding with parison manipulation.

The other plastics part to be bonded to the pipe can be an attachment, for example a quick connector, a branch, a valve, or a cap for the pipe. The other plastics part has at least one nipple intended for bonding to the pipe. This nipple may be of smooth design, or else may have an external profile, e.g., a conical profile or an olive profile in the case of quick connectors. The other plastics part can be mostly composed of a single material, but may also be composed of two or more different materials produced by multicomponent injection molding, for example. The material may also have reinforcement, for example by means of glass fibers or by carbon fibers, or it may have been rendered antistatic, for which purpose carbon fibers may likewise be used, but use may also be made of conductivity black, graphite fibrils, or any other suitable additive. To this end, the material may be composed entirely of material which has been rendered electrically conductive, or may have been covered internally and/or externally with a layer rendered electrically conductive.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
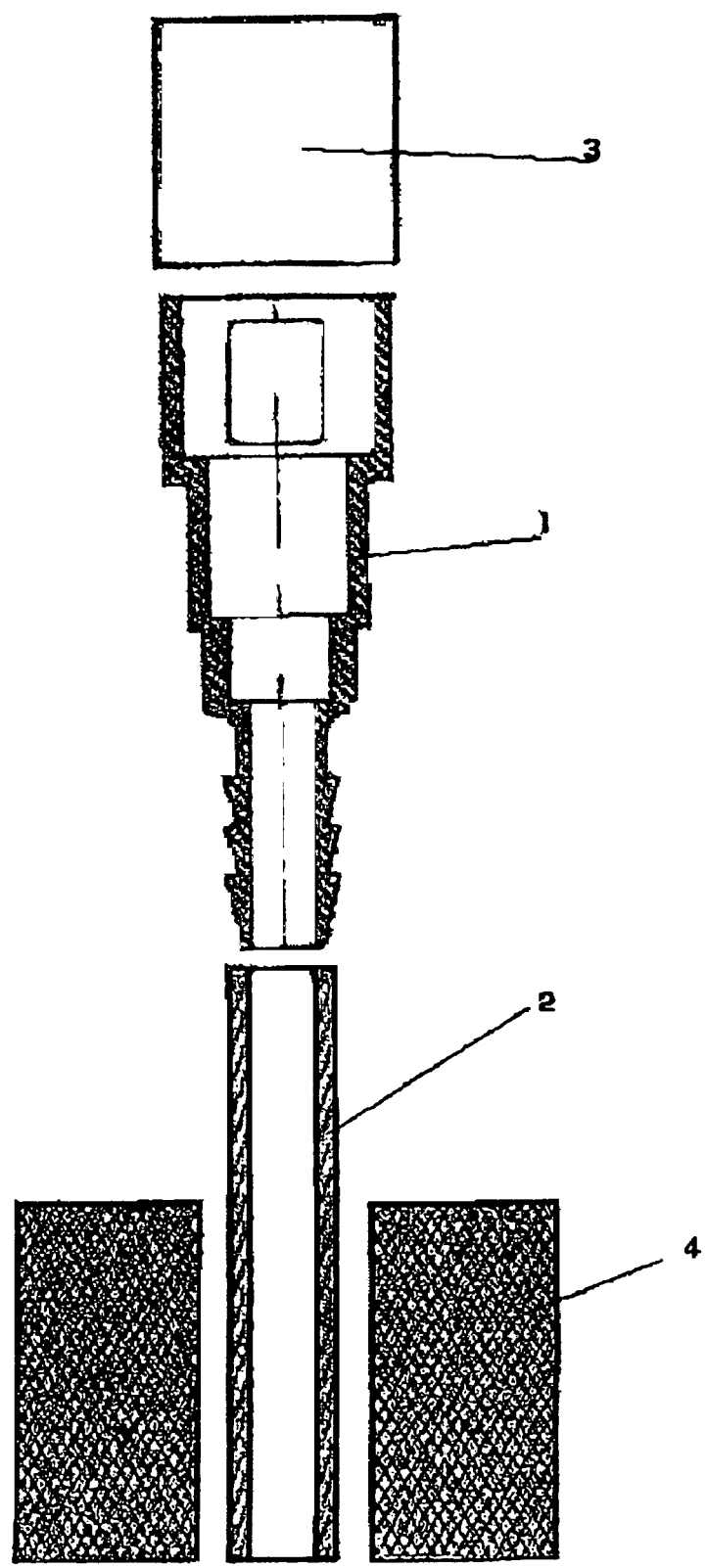
FIG. 1 shows the starting position of the plastics pipe and the other plastics part prior to welding.

Referring now to the drawings, wherein like reference numerals designate identical or corresponding parts throughout the several views, and more particularly to FIG. 1 thereof, this figure shows the starting position of the ultrasound welding machine sonotrode (3), the pipe (2) held in fixing system (4) and the other plastics part (1), a quick connector, for example. As further illustrated by FIG. 1, the sonotrode (3), the pipe (2), and the quick connector (1) are initially separated elements.

Figure 2:
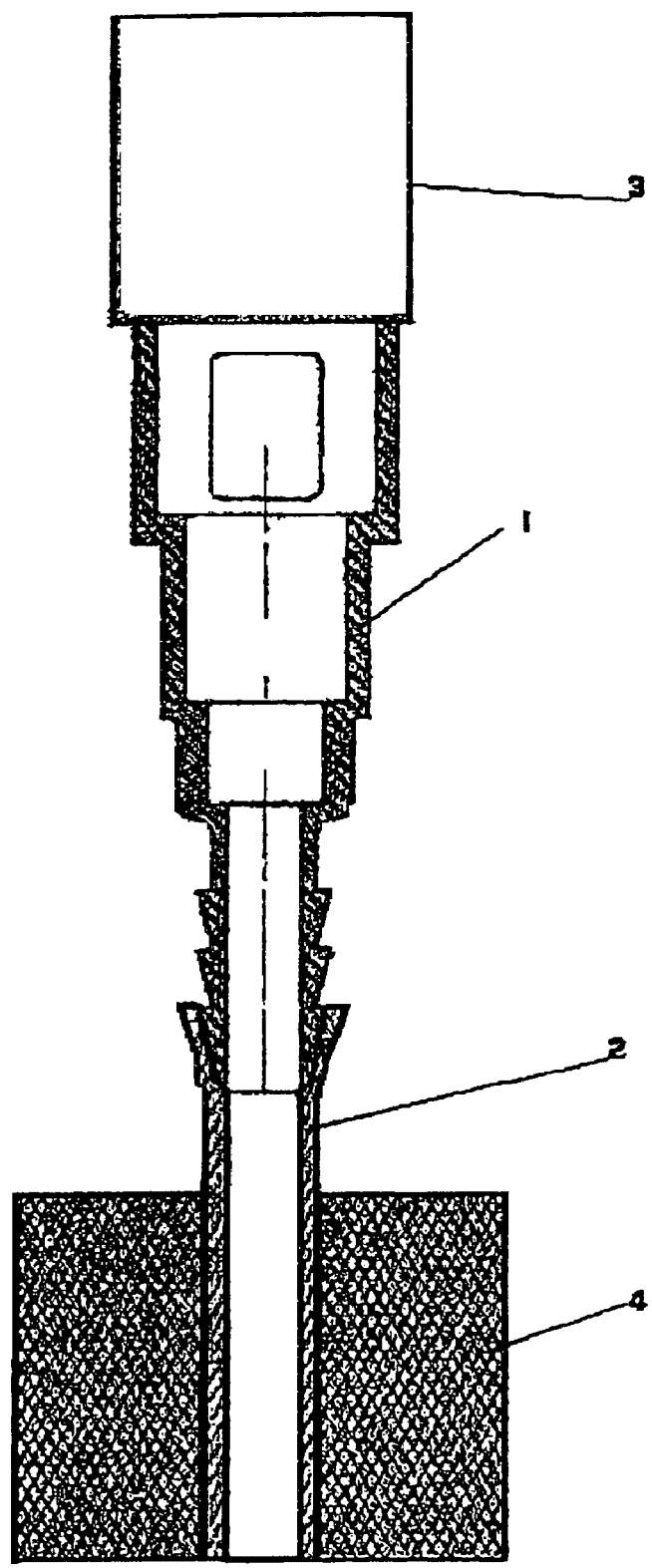
FIG. 2 shows the start of the insertion of the other plastics part into the plastics pipe.

FIG. 2 illustrates the quick connector (1) beginning to be forced to some extent into the pipe (2) with the aid of the ultrasound welding machine sonotrode (3). This is when exposure to ultrasound from the ultrasound sonotrode (3) begins for the quick connector (1).

Figure 3:
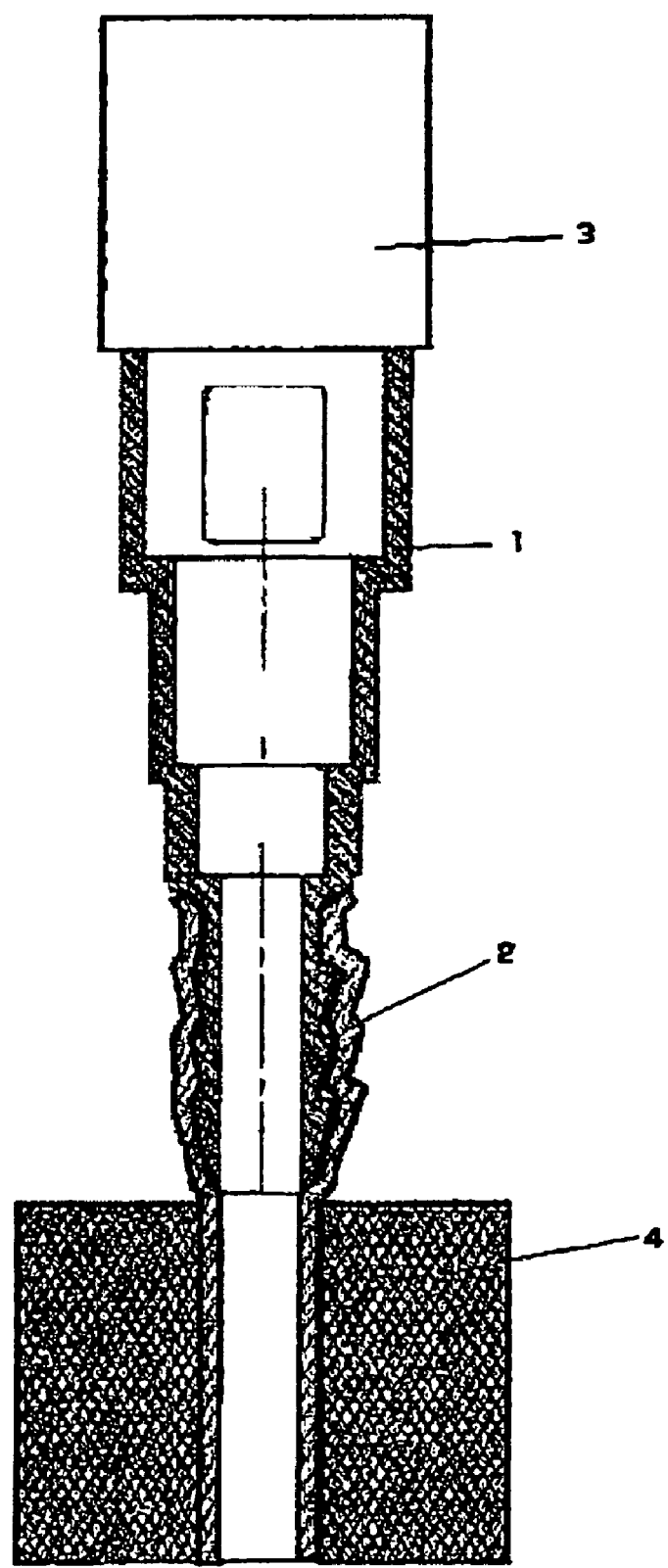
FIG. 3 shows the full insertion of the other plastics part into the plastics pipe.

Simultaneously with this exposure to ultrasound, the quick connector (1) is pressed further into the pipe (2) by the welding machine sonotrode (3) as illustrated by FIG. 3. After the welding procedure, the sonotrode (3) is moved upward and the fixing system (4) for the pipe can be released. If angle connectors have an area for contact with the sonotrode, this process can also be used to produce angle quick connector/pipe bonds.

In one modified arrangement, the sonotrode (3) may also protrude into the quick connector. In another embodiment, the fixing system or block (4) can be provided with elastic walls on the side facing toward the sonotrode (3) so that the widened section of the pipe can be supported by the elastic walls.

The process of the invention may also be used when the pipe area to be welded to the other plastics part is not internal, as described above, but external. This may be necessary if the internal area of a multilayer pipe is unsuitable for welding—for example because of the nature of its material. The pipe to be welded is then advantageously stiffened. The stiffening may, for example, be composed of a flange, or else of an increased wall thickness, of ribbing, of a corrugated structure at the end of the pipe, of a support sleeve forced onto the pipe or fixed thereto, or of a support ring.

An advantage of the process of the invention is the fact that it carries out two steps simultaneously, specifically the forced insertion of the other plastics part and the production of the weld. The weld is produced simultaneously around the periphery, and this means that the parts to be bonded do not have to be rotated around their axis. The implementation of the process requires no new geometric arrangements, and, moreover, can use conventional ultrasound welding equipment at the usual frequencies, e.g., in the range from 15 kHz to 1010 kHz, preferably in the range from 18 kHz to 40 kHz.

What is claimed is:

1. A process for the bonding of a plastics pipe to a coupling end portion of another plastics part by means of ultrasound welding, which comprises the steps of:
   performing ultrasound welding with sound waves which act longitudinally with respect to a plastics pipe axis while maintaining an arrangement of areas to be welded substantially parallel to the plastics pipe axis, and
   forcing insertion of the coupling end portion into the plastics pipe so that the coupling end portion is inserted inside of and widens the plastics pipe during at least part of the time that the sound waves are being provided during the ultrasonic welding step.

2. The process according to claim 1, wherein the exposure to the sound waves is substantially simultaneous with the forced insertion.

3. The process according to claim 1, wherein the plastics pipe is a multilayer pipe comprising a barrier layer and/or comprising an internal layer which has been rendered antistatic.

4. The process according to claim 1, wherein the plastics pipe is a fuel line, a coolant line, a brake fluid line, a hydraulic fluid line, or a windshield washer system line.

5. The process according to claim 1, wherein the other plastics part is a quick connector, a branch, a valve, or a cap for the plastics pipe.

6. The process according to claim 1, wherein the other plastics part is composed of an electrically conductive material, or has been internally and/or externally covered with an electrically conductive layer.

7. The process according to claim 2, wherein the plastics pipe is a multilayer pipe comprising a barrier layer and/or comprising an internal layer which has been rendered antistatic.

8. The process according to claim 2, wherein the plastics pipe is a fuel line, a coolant line, a brake fluid line, a hydraulic fluid line, or a windshield washer system line.

9. The process according to claim 2, wherein the other plastics part is a quick connector, a branch, a valve, or a cap for the plastics pipe.

10. The process according to claim 2, wherein the other plastics part is composed of an electrically conductive material, or has been internally and/or externally covered with an electrically conductive layer.

* * * * *